Feb. 16, 1954
O. WAMBREUZE
2,669,068
FURNACE FOR ANNEALING GLASS
Filed July 21, 1949
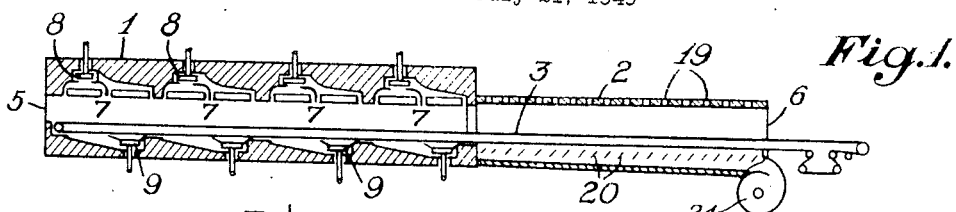
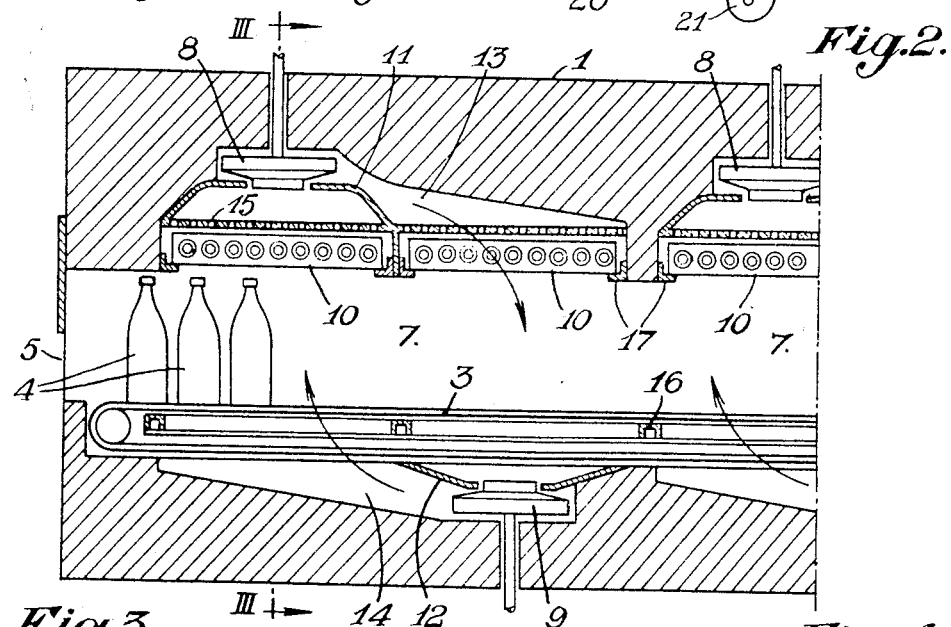
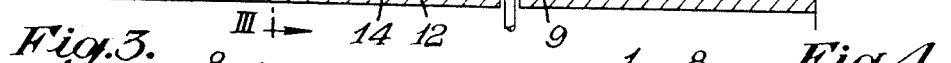
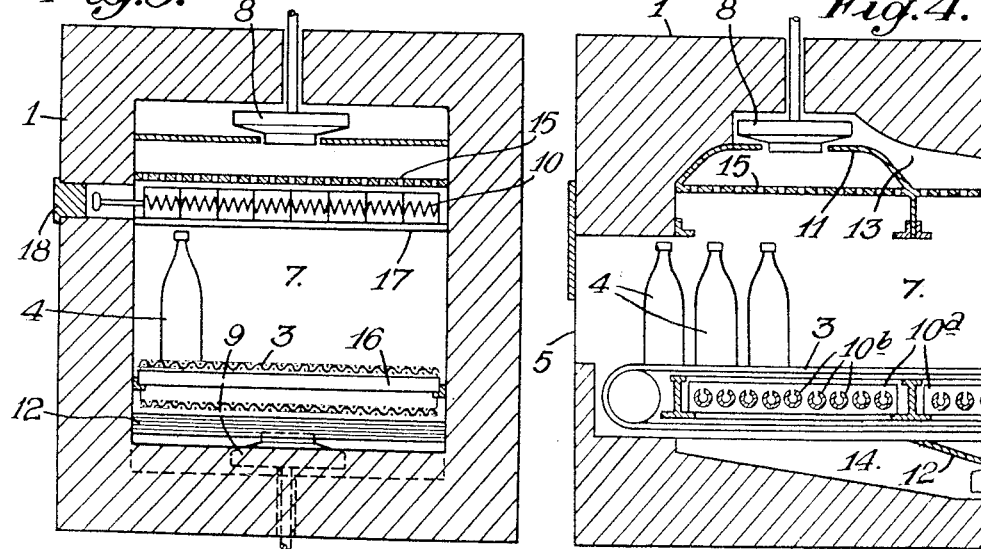
Inventor
O. Wambreuze
By Wenderoth, Lind & Ponack
Attys.

Patented Feb. 16, 1954

2,669,068

UNITED STATES PATENT OFFICE 2,669,068

FURNACE FOR ANNEALING GLASS

Ovide Wambreuze, Brussels, Belgium

Application July 21, 1949, Serial No. 106,058
Claims priority, application Belgium
August 13, 1948

4 Claims. (Cl. 49—47)

The present invention relates to the annealing of glass, that is, to the thermal treatment to which glass is subjected in order to eliminate the internal tensions or stresses due to a too sudden or unequal cooling. For this purpose the glass articles are generally displaced in "tunnel" furnaces, where they are subjected to progressively decreasing temperatures whilst being moved from one end of the furnace to the other.

The annealing of glass is a very delicate operation. The best results are obtained by causing currents of air at the desired temperatures to circulate in direct contact with the glass. Great care must be taken however to ensure uniformity of the temperature at various points of the charge, and to prevent fresh tensions or stresses from appearing in the glass in the course of the cooling.

The object of the invention is to produce a furnace in which the conditions favourable to the uniformity of the thermal treatment, and to the recovery of the heat originally distributed irregularly in the load or charge, are realised better than in existing furnaces, so that the articles may be subjected to temperatures varying according to a curve exactly determined in advance.

The furnace according to the invention is composed of a series of chambers provided with adjustable heating means and with fans arranged above and/or below the path of the charge, so that in the course of its displacement in the furnace the charge will be subjected to hot currents directed alternately upwards and downwards. Preferably each chamber possesses two fans, one at the upper part and the other at the lower part, offset from each other in the longitudinal direction, and also deflectors arranged so as to guide the current of air along the ceiling and along the bottom, the air thus circulating in each chamber in a closed circuit, vertically through the charge, and horizontally above and below it. Batteries of heating elements are arranged under the ceiling of the furnace to effect the heating of the air currents, and at the same time they act on the glass by radiation, thus ensuring in each chamber the required uniformity of temperature.

In the accompanying drawings, which represent by way of example one form of construction of a furnace according to the invention:

Figure 1 is a diagrammatic longitudinal section of the whole of the furnace;

Figure 2 shows on a larger scale the longitudinal section of a chamber;

Figure 3 is a transverse section on the line III—III of Figure 2, and

Figure 4 is a similar view of a modification.

The furnace shown is constituted in a known manner by a tunnel, the first part 1 of which, from the entrance of the furnace, possesses a series of chambers which are heated and thermally insulated from the outside, whilst the second part 2, which extends to the outlet, possesses one or more cooled chambers. A continuously moving conveyor 3 conveys the articles 4 that have come from the manufacturing moulds from the entrance 5 of the furnace to the outlet 6.

In accordance with the invention, the chambers 7 of the heated part of the furnace are equipped so as to be traversed by currents, in closed circuit, which are directed transversely to the path of the charges, alternately upwards and downwards, as shown by the arrows in Figure 2. This result is most effectively produced by providing each chamber 7 with two fans, one fan 8 at the upper part and the other fan 9 at the lower part, offset with respect to one another in the longitudinal sense of the furnace. Heating batteries 10, 10, formed for example by electrical resistances, are placed under the ceiling of the furnace and constitute a radiating ceiling above the charge to be annealed.

Deflectors 11 and 12 placed in the vicinity of the fans 8 and 9 channelise the air currents so that the fan 8 draws in air through a heating battery 10 and delivers it through a flue 13 and through the next battery 10 facing the fan 9, which draws in air in a downward direction through the charge and delivers it through the flue 14 facing the fan 8, which draws it up again through the charge in an upward direction in a continuous circuit. Metal trelliswork or perforated plates 15 distribute the currents evenly over the whole surface of the batteries 10, 10. The conveyor 3 is also formed by trelliswork and rests upon supports 16 of openwork construction, which do not oppose any resistance to the passage of the air.

This arrangement enables a very active air circulation to be produced. The continuity of the contact of the air with the charge and the reversal of the direction of the currents ensures a high efficiency of the heat exchange, with reduced heat consumption, and the duration of the treatment can also be greatly reduced in comparison with the treatment in the usual furnaces. Moreover it is made possible to regulate the temperature and maintain it constant in each chamber with great precision.

The arrangement of the heating batteries described facilitates their replacement for purposes of repair or cleaning. To this end the batteries 10, 10 are mounted on beams 17 forming slides facing openings formed in the wall of the furnace, which are normally closed by sliding shutters 18.

The cooled part of the furnace indicated at 2 may be of any suitable construction. Figure 1 shows a metallic envelope or casing containing holes 19 in the upper part and supplied with air at the lower part, through adjustable slats 20, by a fan 21. It is however also possible to use chambers of various types, for example chambers which are similar to the chambers 7 but which are not provided with heating means, and which may communicate or not with the outside.

Other modifications in construction can obviously be applied to the example described and shown without going outside the scope of the invention. Thus the heating batteries 10a may be arranged beneath the path of the charge, and may be formed by gas or oil burners 10a as shown in Fig. 4.

I claim:

1. A furnace for annealing glass articles comprising an annealing tunnel, a conveyor for carrying glass articles through said tunnel, a plurality of gas ducts in said tunnel, gas heating means and gas blowing means in said tunnel, said ducts, heating means and blowing means forming independent continuous circuits for the gas streams in said tunnel, said gas streams passing through the charge in a direction which is perpendicular with respect to the direction of the movement of the charge, said gas ducts opening into said tunnel through complementary gas inlets and gas outlets located above and beneath the conveyor, each gas inlet above the conveyor being located substantially vertically above and cooperating with a gas outlet beneath the conveyor and each gas outlet above the conveyor being located substantially vertically above and cooperating with a gas inlet beneath the conveyor, all said gas inlets and gas outlets above the conveyor, and all said gas inlets and gas outlets beneath the conveyor succeeding each other alternately in the direction of movement of the charge carrying portion of the conveyor.

2. A furnace for annealing glass articles as claimed in claim 1, longitudinal recesses in the top and bottom of said tunnel partially forming said ducts, heating elements constituting said heating means located in the top recesses of said tunnel and constituting the ceiling of the latter, and said blowing means causing ascending and descending gas streams to pass through said heating elements.

3. A furnace for annealing glass articles as claimed in claim 2 and including deflectors in said longitudinal recesses in the top and in the bottom of said tunnel and open in a vertical direction thereinto.

4. A furnace as claimed in claim 1 and wherein said heating means are arranged below said conveyor within the space through which the conveyor passes.

OVIDE WAMBREUZE.

References Cited in the file of this patent

UNITED STATES PATENTS

| Number | Name | Date |
|---|---|---|
| 1,487,362 | Rice | Mar. 18, 1924 |
| 1,618,660 | Howard | Feb. 22, 1927 |
| 1,701,223 | Bergman | Feb. 5, 1929 |
| 1,759,624 | Mayo | May 20, 1930 |
| 1,949,716 | Harsch | Mar. 6, 1934 |
| 1,996,680 | Lobley | Apr. 2, 1935 |
| 2,104,173 | Sibson | Jan. 4, 1938 |
| 2,217,452 | Peck | Oct. 8, 1940 |
| 2,458,040 | Weller | Jan. 4, 1949 |
| 2,547,795 | Stordy | Apr. 3, 1951 |

FOREIGN PATENTS

| Number | Country | Date |
|---|---|---|
| 931,464 | France | Feb. 24, 1948 |